(12) United States Patent
Gupta et al.

(10) Patent No.: US 9,086,989 B2
(45) Date of Patent: Jul. 21, 2015

(54) EXTENDING PROCESSOR MMU FOR SHARED ADDRESS SPACES

(75) Inventors: Vineet Gupta, Chhattisgarh (IN); Thomas Pennello, Santa Cruz, CA (US)

(73) Assignee: Synopsys, Inc., Mountain View, CA (US)

( * ) Notice: Subject to any disclaimer, the term of this patent is extended or adjusted under 35 U.S.C. 154(b) by 569 days.

(21) Appl. No.: 13/427,881

(22) Filed: Mar. 23, 2012

(65) Prior Publication Data

US 2013/0007407 A1    Jan. 3, 2013

(30) Foreign Application Priority Data

Jul. 1, 2011    (IN) .............. 2245/CHE/2011

(51) Int. Cl.
*G06F 12/00*    (2006.01)
*G06F 12/10*    (2006.01)
*G06F 12/14*    (2006.01)

(52) U.S. Cl.
CPC ........ *G06F 12/1036* (2013.01); *G06F 12/1009* (2013.01); *G06F 12/109* (2013.01); *G06F 12/1483* (2013.01); *G06F 12/10* (2013.01); *G06F 12/1458* (2013.01); *G06F 2212/656* (2013.01)

(58) Field of Classification Search
CPC ... G06F 12/10; G06F 12/1009; G06F 12/109; G06F 12/1458; G06F 12/1483
USPC ................................ 711/203–209, 147–153
See application file for complete search history.

(56) References Cited

U.S. PATENT DOCUMENTS 6,839,813 B2 *   1/2005   Chauvel ..................... 711/145
7,437,717 B1 *   10/2008  Cowan et al. ................ 717/131

* cited by examiner

*Primary Examiner* — Reginald Bragdon
*Assistant Examiner* — Hannah A Faye-Joyner
(74) *Attorney, Agent, or Firm* — Fenwick & West LLP

(57) ABSTRACT

A system and a method are disclosed for more efficiently handling shared code stored in memory, comprising a modified memory management unit containing a new shared address space identifier register, and a modified TLB entry containing a new shared bit.

22 Claims, 3 Drawing Sheets

EXTENDING PROCESSOR MMU FOR SHARED ADDRESS SPACES

CROSS REFERENCE TO RELATED APPLICATIONS

This application claims the benefit of India Provisional Application No. 2245/CHE/2011, filed Jul. 1, 2011, which is incorporated by reference in its entirety.

BACKGROUND

1. Field of Art

The disclosure generally relates to the field of processor design and memory.

2. Description of the Related Art

Memory management unit (MMU)-based systems provide for virtual memory by translating virtual addresses to physical addresses. This translation is a lookup process where the MMU receives a search key (the virtual address) and outputs the corresponding physical address.

In certain architectures, the MMU primarily uses page tables in random access memory (RAM) for lookup. An operating system (OS) is responsible for managing these page tables. Since trips to RAM are several orders of magnitude slower than CPU processing, the MMU caches the recently used translation entries in a fast on-chip associative memory called a translation lookaside buffer (TLB). The MMU uses the TLB for first level lookup, and as a fall-back, the MMU resorts to page table traversal.

In RISC type architectures, on the other hand, the TLB is not a cache, but rather a database of translation entries. The OS is responsible for all TLB entry management. The MMU is agnostic of the page tables, although the OS still has to maintain the page tables and possibly other related data structures (e.g., the source of translation entries). In this way, the OS oversees the memory management of all running processes.

Any modern-day OS runs several processes concurrently. Each process has its own virtual address space to map its code, data, .bss segment, stack, heap and some other regions. Since all processes have their own virtual address space, is possible for multiple processes to reference the same virtual address, even though they intend to refer to different pieces of code, and ultimately different physical addresses. This can cause TLB entries with overlapping virtual addresses. To remedy this, the OS either has to flush the entire TLB across every task-switch, or the MMU needs to provide a mechanism to let overlapping TLB entries co-exist. In the latter case, the MMU must also ensure that lookup searches only through the relevant entries.

Some MMUs provides this disambiguation in the form of an address space ID (ASID), an additional identifier, used to "tag" the TLB entries. The OS manages the ASID and assigns each process a unique value. TLB lookup now uses a compound key comprising a virtual address and the ASID. This allows entries for different processes with identical virtual addresses to coexist. Every time the process changes, an MMU process ID (PID) register is setup with the new process's ASID. All TLB operations (both in hardware and software) happen in the context of this ASID. In this way, multiple processes can be run sequentially without modifying their virtual address space or flushing the TLB on every task switch.

As modern day programs get bigger and bulkier, they need to rely on reusing existing code in form of libraries. Most programs link with shared code, such as libraries, for example, libc (the ubiquitous "C" library), libpthread, libm, etc. While static libraries do allow code reuse, they cause each program to link in a copy of the library or libraries, blowing up the system memory footprint. Shared libraries mitigate this by having system runtime (the dynamic loader assisted by the OS) load only a single instance of the shared library into RAM. Programs then dynamically link with the libraries at runtime using shared mapping (mmap system call). These links use virtual addresses in each process's private address space. This is an optimal solution which allows code reuse, low memory footprint and flexibility in choice of virtual address space used for mapping, at the same time. However, shared libraries could be bottlenecked by the ASID feature of the MMU explained above. To understand this better, we use the ARC700 MMU as an example MMU implementation; although it applies to most software managed TLB MMU designs.

Linux, as it runs on an ARC700, uses one ASID per processes. This means that each running process must have its own virtual address space. If two or more processes are using shared libraries, each process will therefore require a process-private TLB entry corresponding with the shared library. This is true even when the virtual addresses all correspond to the same physical page. This is wasteful because each of the TLB entries across the running processes is the same except for the ASID. For example, if there are 10 processes running concurrently, the libc code is hypothetically 16 KB (the ARC700 MMU has an 8 KB page size), and all processes are executing code in either of the 2 pages of libc, then there will be 10×(16 KB/8 KB)=20 TLB entries corresponding to libc code alone in the system. This increases the pressure on the TLB when heavy-weight libraries such as webkit are used whose text alone is 7.5 MB. In effect, the process-private TLB entries reduce the effective TLB size. This causes increased contention for TLB slots, which therefore increase the frequency of entry eviction/replacement, meaning precious CPU cycles are wasted in the OS while it runs TLB fault handlers.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium that includes more efficiently handling shared code stored in memory, comprising a memory management unit (MMU) containing a new shared address space identifier (SASID) register, and a modified TLB entry containing a new shared bit.

By way of example, in one embodiment, the MMU first is presented with a virtual address and an address space identifier (ASID). It then accesses the TLB entry, which includes the virtual address entry and a different physical address entry. If the shared bit in the TLB entry indicates the entry is a shared entry, the MMU accesses the contents of the SASID register. After comparing the contents of the SASID register and SASID in the TLB entry, the MMU accesses an address in the memory corresponding to the physical address in the TLB entry.

Computing Machine Architecture

Figure 1:
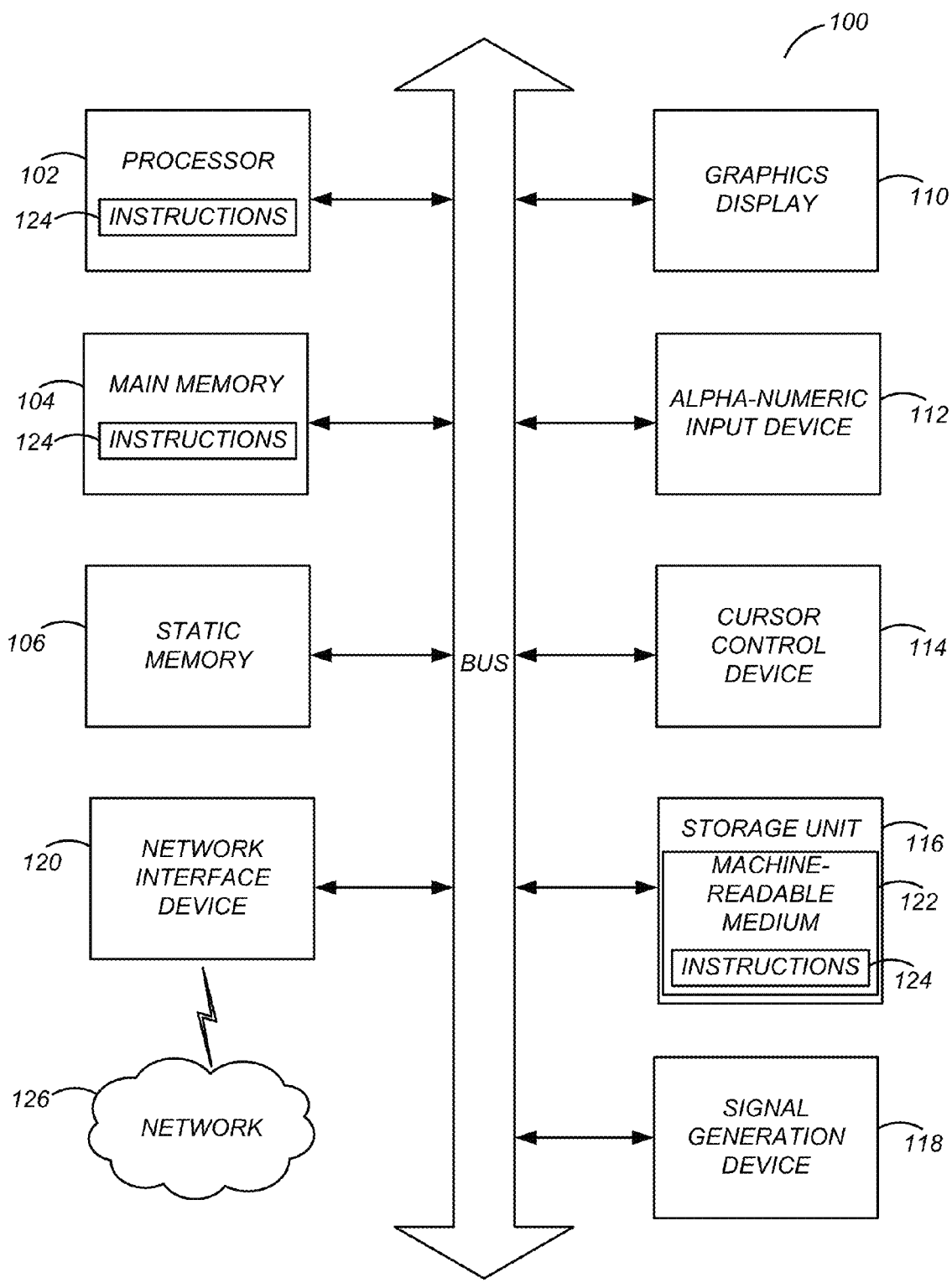
FIG. 1 illustrates one embodiment of components of an example machine able to read instructions from a machine-readable medium and execute them in a processor (or controller).

Referring briefly to FIG. 1, it illustrates block diagram components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other with a memory management unit (MMU) and a translation lookaside buffer (TLB) via a bus 108. The MMU and TLB may exist in one or all of the processor, main memory, or static memory. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108.

The storage unit 116 includes a machine-readable medium 122 on which is stored instructions 124 (e.g., software, shared code, libraries) embodying any one or more of the methodologies or functions described herein. The instructions 124 (e.g., software, shared code, libraries) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software, shared code, libraries) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Memory Management Unit and Translation Lookaside Buffer

Figure 2:
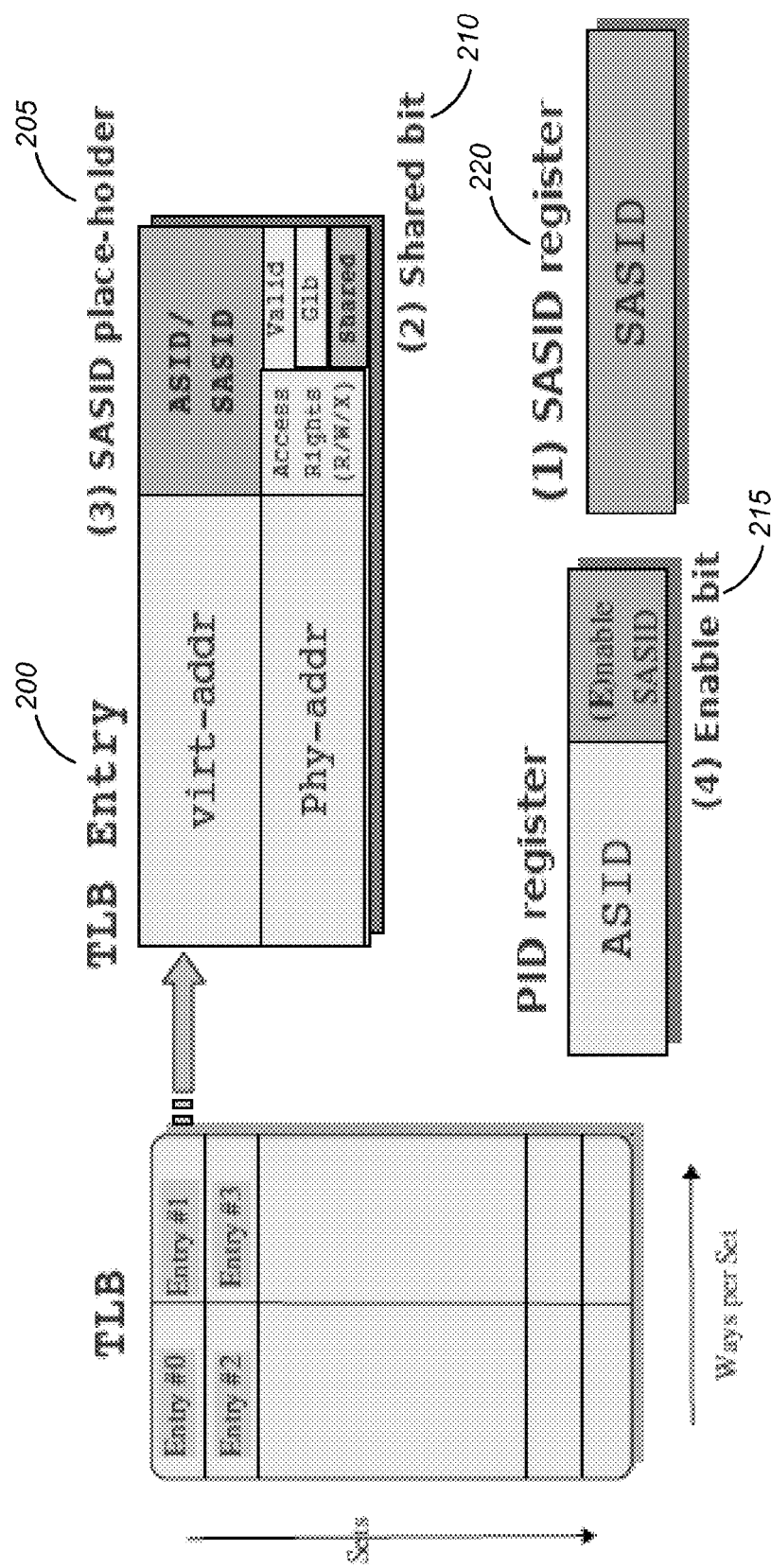
FIG. 2 illustrates one example embodiment of the changes made to the translation lookaside buffer (TLB) Entry and the process ID (PID) register, as well as one example embodiment of the new shared address space ID (SASID)) register.

Referring now to FIG. 2, illustrated are examples of a memory management unit (MMU). In one embodiment, the MMU has an SASID Register 220 of some width (e.g., 32 bits), where each bit represents a unique shared address space ID (SASID). This shared address is in addition to the per-process private address space and the global address space. At runtime, the OS, or similar entity, assigns each shared code (such as a library) an SASID. The term "code" shall be taken to mean any data stored in memory and accessible with the MMU. In addition, the TLB management interface is expanded to support invalidation of TLB entries with SASIDs. Also, the MMU revision ID may be increased, and placed in a build configuration register to allow the OS determine the feature-set of the MMU. This will allow the OS to engage the SASID features of the processor.

Continuing with FIG. 2, illustrated are example changes to the translation lookaside buffer (TLB). In one embodiment, the TLB entry 200 is modified to include a new shared bit 210. This shared bit indicates whether or not the TLB entry refers to a normal address space ID (ASID) or a SASID. For example, if the shared bit is 0, then the TLB entry will be interpreted normally. If the shared bit is 1, then the TLB entry will be interpreted as a shared TLB. In the event that the TLB entry is a shared TLB entry, then the ASID field 205 of the entry is understood to be an SASID field, and will be processed accordingly. When the OS creates the TLB entries for any sharable mappings, it creates shared TLB entries by enabling the shared bit 210 and specifying the SASID of the shared library instead of the ASID of the process.

In some embodiments, there is a new global extra control bit 215, which enables or disables the SASID processing for a specific PID.

Processing with the SASID

Figure 3:
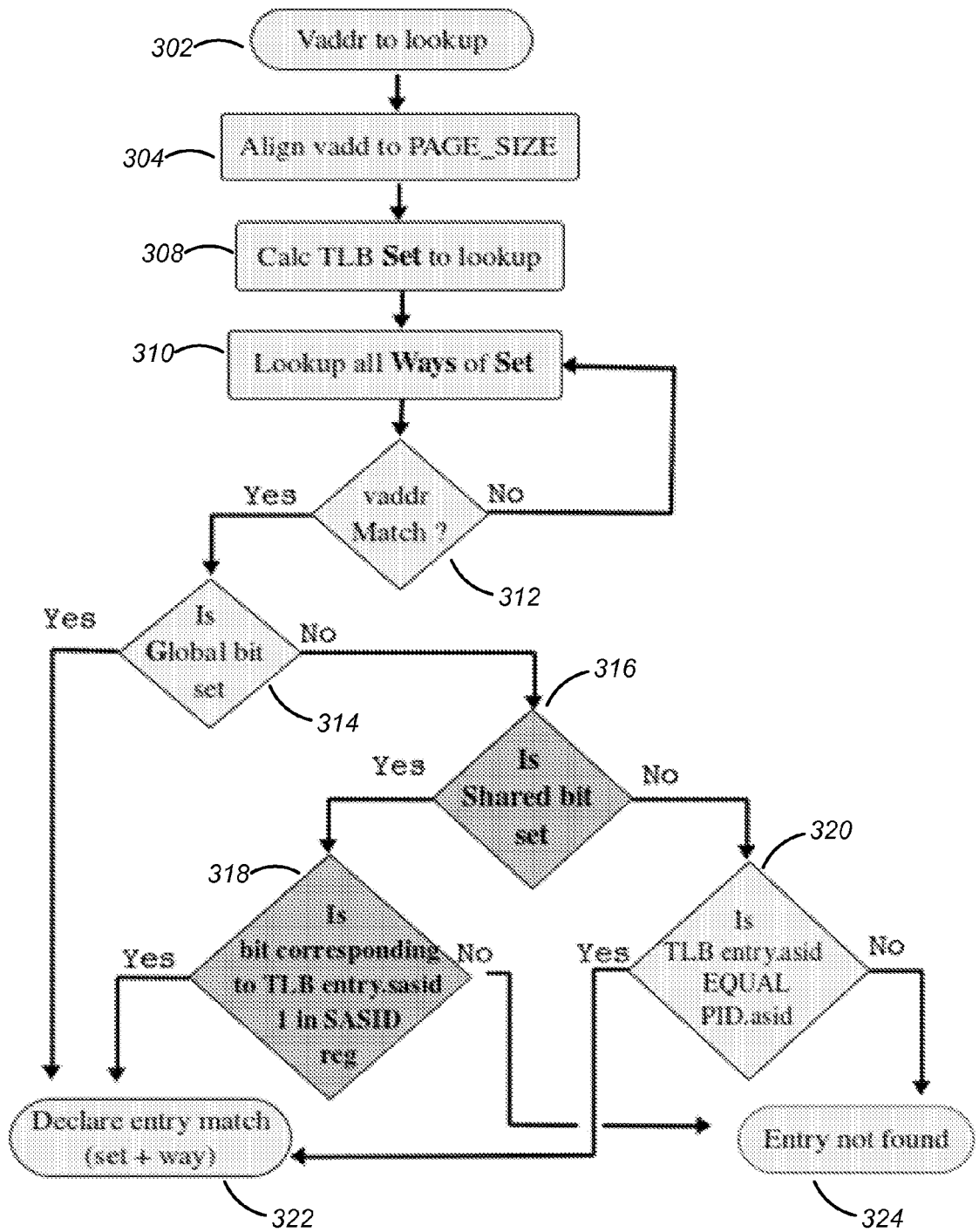
FIG. 3 illustrates one example embodiment of the lookup flow chart including the new shared bit and the SASID register.

Referring now to FIG. 3, illustrated is one example embodiment of the process by which the MMU performs a lookup when passed 302 a virtual address (vaddr). First, the MMU aligns 304 the vaddr with the page size, and then calculates 308 the set index. The set index is where to do the lookup. Next, the MMU selects 310 a way of the set, and looks 312 for the vaddr in the TLB entry. If the vaddr is found, the MMU looks 314 to see if the global bit is set in the entry. If the global bit is set, the MMU declares 322 a match and returns the physical address in entry to CPU. If the global bit is not set, then the MMU looks 316 to see if the shared bit is set. If the shared bit is set, then the MMU interprets the ASID in the entry as an SASID, and checks 318 if the bit denoted by that entry is present (e.g. its value is 1) in the MMU SASID register. In various embodiments, this check may be a bit-wise AND operation, such as (MMU_SASID_REGISTER & (1<<TLB_entry.sasid)). If the SASID is found, then the MMU declares 322 a match and returns the physical address. If the SASID is not found, then the MMU declares 324 the entry is not found. If the shared bit is not set, then the MMU looks 320 for the ASID in the entry and matches it against the ASID in the MMU PID register. If the ASID is found, then the MMU declares 322 a match and returns the physical address. If the ASID is not found, then the MMU declares 324 the entry is not found. Upon receiving an entry not found indication from the MMU, the CPU typically raises a TLB miss exception.

The disclosed embodiments beneficially increase the processing time spent computing user code. The number of TLB misses for shared code pages decrease because once an entry is created (and assuming is not evicted out by other TLB miss exceptions, such that a new entry indexes into the same set and way), the next process needing to access the same page can continue to use the existing TLB entry without having to fault on access. Also, shared TLB entries increase the effective TLB size for other type of TLB entries, like process-private entries. This reduces the number of TLB misses which happen due to eviction (refill), and this in turn implies the OS is spending less time doing TLB Miss handling. Furthermore, modern day OS such as Linux use copy-on-write (COW) technique heavily. This involves downgrading the existing writable TLB entries to read-only at the time of fork system call. Given the simplistic TLB management provided by most MMUs (including ARC700), this involves linearly walking through the MMU to discard relevant TLB entries. Instead Linux invalidates the entire address space of the parent process (and all its TLB entries) by allocating it a new ASID. The bad side effect of this is that even the code TLB entries, which always remain read-only, get invalidated as well and need to be resurrected, one entry a time, as process accesses such code after the fork system call. In the proposed scheme, the shared TLB entries will not get invalidated post fork.

Other Scenarios and Use-Cases

In one example use case, the shared library code, mapped by dynamically linked executables, will be the direct beneficiary of this idea. However, the OS can apply the same scheme to the code of an executable itself (both static as well as dynamically linked programs). This would be especially true for embedded systems using a single multi-functional binary such as Busybox, where a single ELF binary contains code for all basic UNIX utilities (e.g., ls, cat, mount, user shell, init, etc.). The program code entries can be setup with SASID TLB entries so that across fork( ) system calls, and even across execve( ) the same TLB entries can be used by the new processes.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, e.g., as described with FIG. 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods, e.g., as described with FIG. 3, described herein may be performed, at least partially, by one or more processors, e.g., 102, that are temporarily configured (e.g., by software) or permanently configured to perform the relevant operations. Whether temporarily or permanently configured, such processors 102 may constitute processor-implemented modules that operate to perform one or more operations or functions. The modules referred to herein may, in some example embodiments, comprise processor-implemented modules comprised of program instructions 124.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory), for example, as described and illustrated with FIG. 3. These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for more efficiently handling shared code stored in memory, through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for accessing shared code on a system, wherein the system comprises a memory, a memory management unit (MMU) with a shared address space identifier (SASID) register, and a translation lookaside buffer (TLB) entry with a shared bit, the method comprising:
   requesting a contents of a memory address in the memory, the request comprising a virtual address entry and an address space identifier (ASID) entry;
   responsive to the request, accessing the TLB entry, the TLB entry comprising the virtual address entry and a physical address entry;
   determining a state corresponding to a shared bit in the TLB entry;
   responsive to the state of the shared bit, accessing the contents of the SASID register; and
   responsive to a comparison of the contents of the SASID register and the ASID entry, accessing an address in the memory corresponding to the physical address entry the comparison of the contents of the SASID register and the ASID entry comprising:
   accessing the contents of the SASID register; and
   accessing a bit in the contents of the SASID register denoted by the value of the ASID entry.

2. The method of claim 1, wherein the system comprises a process identifier (PID) register with an enable bit, and wherein determining the state of the shared bit additionally comprises determining the state of the enable bit.

3. The method of claim 2, additionally comprising:
   identifying, for a program, an ASID value and an SASID value;
   setting the value of the PID register to the ASID value; and
   setting the value of the SASID register to the SASID value.

4. The method of claim 1, wherein the contents of the SASID register comprise a binary string, wherein each bit represents a unique SASID.

5. The method of claim 1, wherein the shared code is a software library.

6. The method of claim 1, wherein the shared code is a part of an operating system.

7. A method for enabling shared code on a system, wherein the system comprises a memory, a memory management unit (MMU) with a shared address space identifier (SASID) register, and a translation lookaside buffer (TLB) table, wherein each entry of the TLB has a shared bit, the method comprising:

identifying a memory address of the shared code, the memory address identifying a location of the shared code in the memory;

identifying a SASID, wherein the SASID contains the shared code;

creating a TLB entry in the TLB table, wherein the TLB entry comprises the memory address, the SASID, and an enabled shared bit; and enabling the shared bit in response to the shared code in the SASID;

wherein contents of the SASID register comprise a binary string, wherein each bit represents a unique SASID.

8. The method of claim 7, wherein enabling the shared bit comprises setting the value of the shared bit to 1.

9. The method of claim 7, wherein the shared code is a software library.

10. The method of claim 7, wherein the shared code is a part of an operating system.

11. A system for handling shared code in a memory lookup table, comprising:
a memory management unit (MMU) comprising:
a shared address space ID (SASID) register; and
a process identifier (PID) register comprising a PID address space identifier (ASID) value and a PID shared enable value; and
a translation lookaside buffer (TLB) comprising:
a physical memory address;
an ASID register;
a global bit; and
a shared bit;
wherein: responsive to a value of the shared bit and a comparison between a value of the SASID register and a value the ASID register, a plurality of programs access the physical memory address.

12. The system of claim 11, wherein, responsive to a value of the global bit, a plurality of programs access the physical memory address.

13. The system of claim 11, wherein the MMU and TLB are within a processor.

14. The system of claim 11, comprising an operating system (OS), wherein the OS manages the MMU and the TLB.

15. The system of claim 11, wherein, responsive to the value of the shared bit and a comparison between the value of the ASID register and the PID ASID value, a program accesses the physical memory address.

16. The system of claim 11, wherein the system additionally comprises a processor, wherein the processor performs the comparison between the value of the SASID register and the value the ASID register.

17. A non-transitory computer readable storage medium for accessing shared code having executable computer program instructions embodied therein, the computer program instructions for execution on a system comprising a processor, a memory, a memory management unit (MMU) with a shared address space identifier (SASID) register, and a translation lookaside buffer (TLB) table, wherein each entry of the TLB has a shared bit, the computer program comprising instructions that when executed cause a processor to:
request a contents of a memory address in the memory, the request comprising a virtual address entry and an address space identifier (ASID) entry;
responsive to the request, access the TLB entry, the TLB entry comprising the virtual address entry and a physical address entry;
determine a state corresponding to a shared bit in the TLB entry;
responsive to the state of the shared bit, access the contents of the SASID register; and
responsive to a comparison of the contents of the SASID register and the ASID entry, access an address in the memory corresponding to the physical address entry, the comparison of the contents of the SASID register and the ASID entry further comprising instructions that when executed cause the processor to:
access the contents of the SASID register; and
access a bit in the contents of the SASID register denoted by the value of the ASID entry.

18. The non-transitory computer readable storage medium of claim 17 further comprising a program identifier (PID) register with an enable bit, the storage medium further comprising instruction that when executed cause the processor to additionally determine the state of the enable bit.

19. The non-transitory computer readable storage medium of claim 18, further comprising instruction that when executed cause the processor to:
identify, for a program, an ASID value and an SASID value;
set the value of the PID register to the ASID value; and
set the value of the SASID register to the SASID value.

20. The non-transitory computer readable storage medium of claim 17, wherein the contents of the SASID register comprise a binary string, wherein each bit represents a unique SASID.

21. A method for accessing shared code on a system, wherein the system comprises a memory, a memory management unit (MMU) with a shared address space identifier (SASID) register, and a translation lookaside buffer (TLB) entry with a shared bit, and a process identifier (PID) register with an enable bit, the method comprising:
requesting a contents of a memory address in the memory, the request comprising a virtual address entry and an address space identifier (ASID) entry;
responsive to the request, accessing the TLB entry, the TLB entry comprising the virtual address entry and a physical address entry;
determining a state corresponding to a shared bit in the TLB entry and a state corresponding to the enable bit;
responsive to the state of the shared bit, accessing the contents of the SASID register; and
responsive to a comparison of the contents of the SASID register and the ASID entry, accessing an address in the memory corresponding to the physical address entry the comparison of the contents of the SASID register and the ASID entry comprising:
accessing the contents of the SASID register; and
accessing a bit in the contents of the SASID register denoted by the value of the ASID entry.

22. The method of claim 21, additionally comprising: identifying, for a program, an ASID value and an SASID value; setting the value of the PID register to the ASID value; and setting the value of the SASID register to the SASID value.

* * * * *